United States Patent
Odell et al.

(10) Patent No.: US 9,419,876 B2
(45) Date of Patent: Aug. 16, 2016

(54) METHODS AND APPARATUS TO DETERMINE NETWORK DELAY WITH LOCATION INDEPENDENCE FROM RETRANSMISSION DELAY AND APPLICATION RESPONSE TIME

(71) Applicant: Fluke Corporation, Everett, WA (US)

(72) Inventors: Craig Odell, Colorado Springs, CO (US); Daniel Prescott, Elbert, CO (US); Douglas M. Roberts, McDonough, GA (US); Sean O'Brien, Seattle, WA (US); Shawn McManus, Colorado Springs, CO (US)

(73) Assignee: Airmagnet, Inc., Wsetford, MA (US)

( * ) Notice: Subject to any disclaimer, the term of this patent is extended or adjusted under 35 U.S.C. 154(b) by 238 days.

(21) Appl. No.: 14/218,686

(22) Filed: Mar. 18, 2014

(65) Prior Publication Data

US 2015/0271041 A1   Sep. 24, 2015

(51) Int. Cl.
| | | |
|---|---|---|
| H04L 12/26 | (2006.01) | |
| H04L 1/16 | (2006.01) | |
| H04L 1/18 | (2006.01) | |
| H04L 12/24 | (2006.01) | |

(52) U.S. Cl.
CPC .......... *H04L 43/0852* (2013.01); *H04L 43/045* (2013.01); *H04L 43/0864* (2013.01); *H04L 1/16* (2013.01); *H04L 1/18* (2013.01); *H04L 41/5067* (2013.01); *H04L 43/0817* (2013.01)

(58) Field of Classification Search
CPC .............. H04L 43/0852; H04L 43/045; H04L 43/0858; H04L 43/0864
See application file for complete search history.

(56) References Cited

U.S. PATENT DOCUMENTS

| | | | | |
|---|---|---|---|---|
| 9,198,078 | B1* | 11/2015 | Vivanco ............ | H04W 28/0289 |
| 2006/0023673 | A1* | 2/2006 | Read ..................... | H04L 1/1835 370/338 |
| 2006/0218447 | A1* | 9/2006 | Garcia .................. | H04L 43/087 714/39 |
| 2010/0211673 | A1* | 8/2010 | Kosbab ............... | H04L 41/5009 709/224 |
| 2010/0214919 | A1* | 8/2010 | Kosbab .................. | H04L 43/18 370/231 |

\* cited by examiner

*Primary Examiner* — Chi H Pham
*Assistant Examiner* — Weibin Huang
(74) *Attorney, Agent, or Firm* — Locke Lord LLP; Scott D. Wofsy; Christopher J. Capelli (57) ABSTRACT

The techniques disclosed herein determine a location independent network delay, via a network monitoring device. Such techniques particularly include determining various delays caused by retransmission in instances of lost data segments and application response time.

19 Claims, 8 Drawing Sheets

METHODS AND APPARATUS TO DETERMINE NETWORK DELAY WITH LOCATION INDEPENDENCE FROM RETRANSMISSION DELAY AND APPLICATION RESPONSE TIME

BACKGROUND

1. Field of the Invention

The present disclosure relates to communication networks, and more particularly, to determining various types of network delay with location independence from retransmission delay and application data transfer delay.

2. Description of the Related Art

Communication networks typically include, in part, various client-side and server-side devices that transfer information or data there-between. Importantly, metrics such as response time and communication delay between the various network devices provides insight into traffic flow and can be used for developing delay mitigation strategies as well as used to implement changes to network topology, improve communication protocols, and the like.

Network delay between the various devices can be measured, for example, as an end user response time, and includes an aggregate of an application response time, a data transfer time, and a network round trip. Application response time reflects a time to a first byte for transaction response, the data transfer time represents a total time to send all of the requested data in response to a single transaction request, and a network round trip represents a bi-directional network latency (e.g., excluding client/server processing time). Although various techniques are used to measure this end-user response time, however, such techniques are typically influenced by the location where measurement occurs. That is, these various techniques yield different results if measured from close to a server-side device, close to a client-side device, or somewhere in between.

Although determining the end-user response time in this fashion may be important in certain applications, such end-user response time does not scale appropriately when implemented in virtualization solutions and/or cloud outsourcing solutions (e.g., moving further from a server). Accordingly, there is still a need for improved network delay techniques that allow for location independence that are scalable and suitable for virtualized as well as cloud solutions.

SUMMARY

The techniques disclosed herein determine a location independent network delay, via a network monitoring device. Such techniques particularly include determining various delays such as a retransmission delay and an application response time.

With respect to the retransmission delay, in one exemplary embodiment of the invention, the network device monitors an exchange of data segments between at least a first network device and a second network device and determines that the first network device failed to receive at least one lost data segment from the second network device (e.g., the second network device retransmits the lost data segment, the second network device, receives a duplicate acknowledgement indicating retransmission is requested, etc.). In turn, the second network device retransmits the at least one lost data segment. The network monitoring device marks a retransmission delay start time when the second network device transmits a prior acknowledged data segment relative to retransmission of the at least one lost data segment. The network monitoring device also marks a retransmission delay end time when the second network device retransmits the at least one lost data segment to the first network device, and determines a difference between the retransmission delay start time and the retransmission delay end time to yield a total retransmission delay. The network monitoring device, in certain embodiments, displays this total retransmission delay to a resident display.

With respect to application response time, the network monitoring device determines a network round trip time as well as a time difference between a data segment request and a data segment response (for example, between the first network device and the second network device). In particular, the network monitoring device monitors an exchange of data between at least a first network device and a second network device and determines the network round trip time from a time difference between transmission of an initial data signal from the first network device to the second network device and receipt, by the first network device, of a corresponding acknowledgement data signal from the second network device. The network monitoring device further marks an application response start time when a first data segment (e.g., a data segment request) is transmitted from the first network device to the second network device and marks an application response end time when a second data segment (e.g., a data segment response) from the second network device is received by the first network device. The network monitoring device further determines a difference between the application response start time and the application response end time to yield an application response time. Additionally, to account for the network round trip time, the network monitoring device determines a difference between the application response time and the network round trip time to yield a total application response time, which can be subsequently displayed.

It should be noted that such techniques are employed client-side, server-side and network points there-between.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

The invention of this disclosure provides techniques for determining network delay (e.g., caused by retransmission delay and application data transfer delays) with location independence. That is, using the techniques disclosed herein, network delay can be consistently determined from various locations in a network (e.g., client-side, server-side, in-between, etc.). Such techniques prove scalable and particularly useful for cloud based and virtualization based network solutions. Further, based on the determined network delay, mitigation actions can be performed to reduce or eliminate the delay. Reference will now be made to the drawings.

Figure 1:
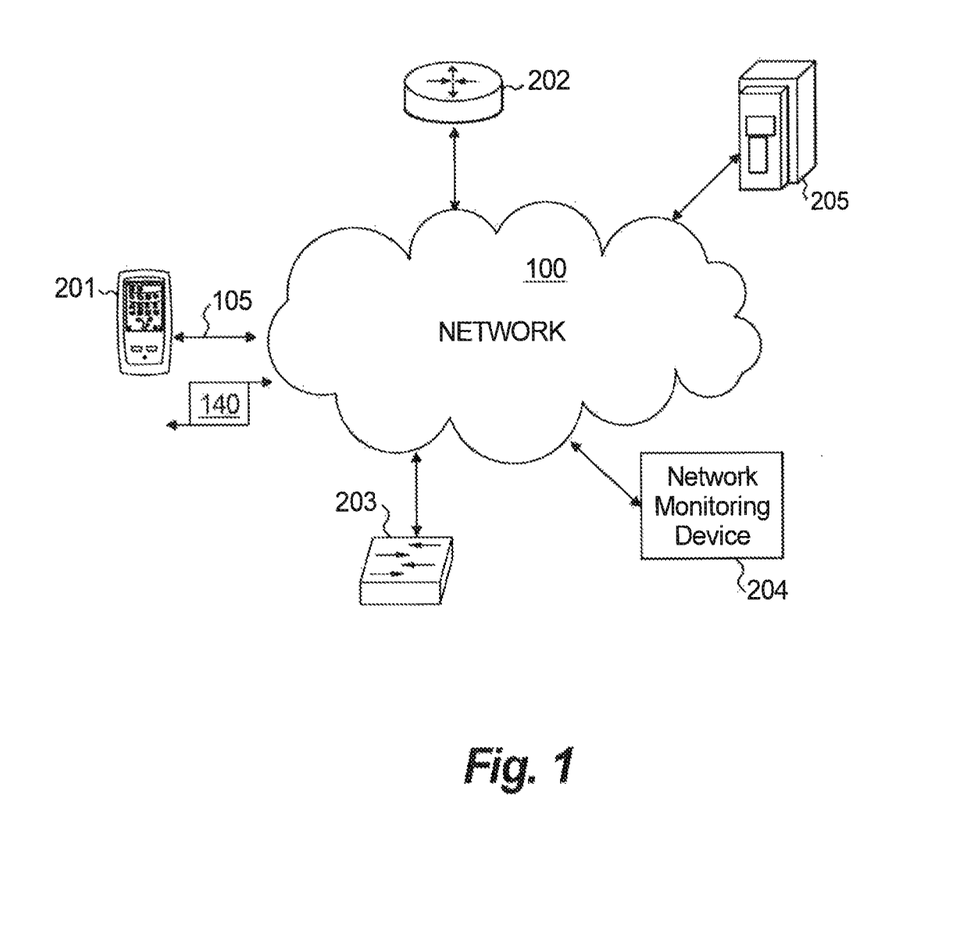
FIG. 1 illustrates an example communication network.

Referring to FIG. 1, a schematic block diagram of a communication network 100 is shown. Communication network 100 is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others.

Still referring to FIG. 1, communication network 100 illustratively comprising nodes/devices 200 (e.g., labeled as shown, 201-205) interconnected by various methods of communication. For instance, a link 105 may be wired links or may comprise a wireless communication medium, where certain nodes 201, such as, e.g., a client node, etc., may be in communication with other nodes 202-205, e.g., routers, sensors, computers, etc., based on distance, signal strength, current operational status, location, etc. Those skilled in the art will understand that any number of nodes, devices, links, etc. may be used in the computer network, and that the view shown herein is for simplicity.

Figure 2:
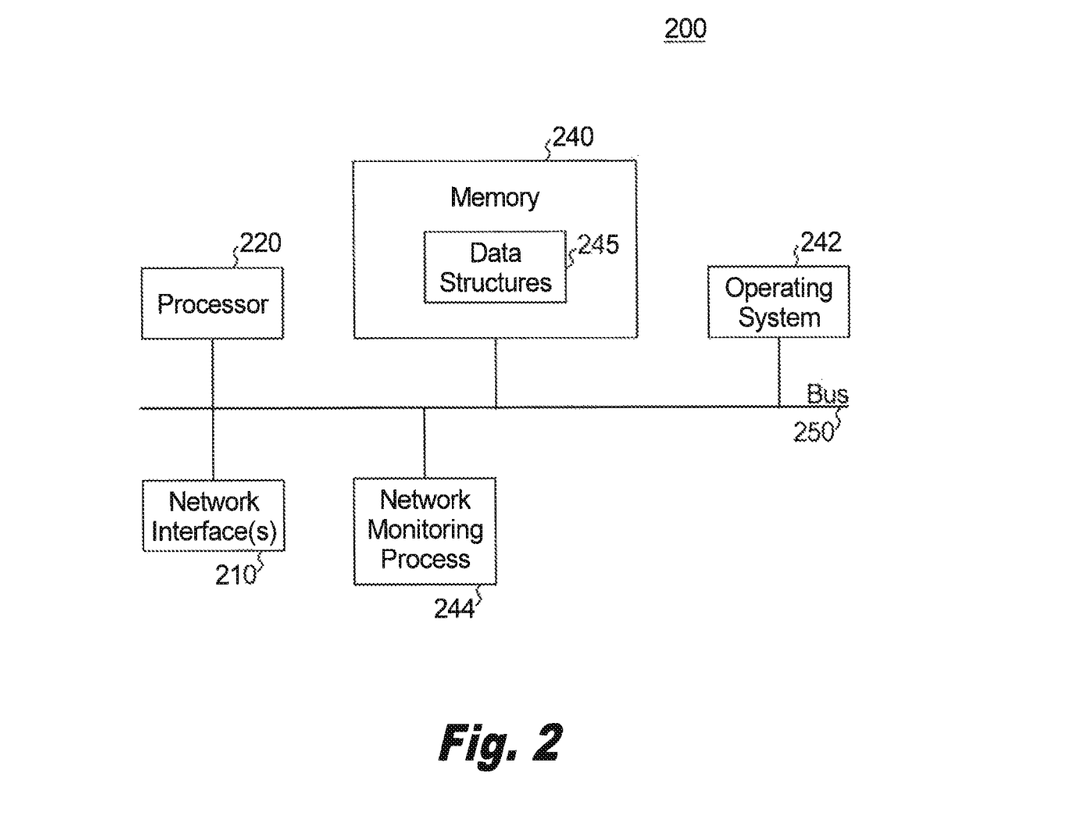
FIG. 2 illustrates an example network device/node.

FIG. 2 is a schematic block diagram of an example node/device 200 that may be used with one or more embodiments described herein, e.g., as a network monitoring device 204, in the network 100. The device 200 may comprise one or more network interfaces 210, at least one processor 220, and a memory 240 interconnected by a system bus 250.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi. Bluetooth®), Ethernet, power-line communication (PLC) protocols, etc.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as routes or prefixes (notably on capable devices only). An operating system 242, portions of which are typically resident in memory 240 and executed by the processor, functionally organizes the device by, inter alia, invoking operations in support of software processes and/or services executing on the device. These software processes and/or services may comprise network monitoring process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network monitoring process (services) 244 contains computer executable instructions executed by the processor 220 to perform functions, such as monitoring data packets transmitted between the various nodes in communication network 100, as will be understood by those skilled in the art.

Illustratively, the techniques described herein may be performed by hardware, software, and/or firmware, such as in accordance with the network monitoring process 244, which may contain computer executable instructions executed by the processor 220 (or independent processor of interfaces 210) to perform functions relating to the techniques described herein.

As noted above, the techniques disclosed herein determine network delay consistently from various locations in a network (e.g., client-side, server-side, in-between, etc.). Such techniques prove scalable and particularly useful for cloud based and virtualization based network solutions.

Figure 3:
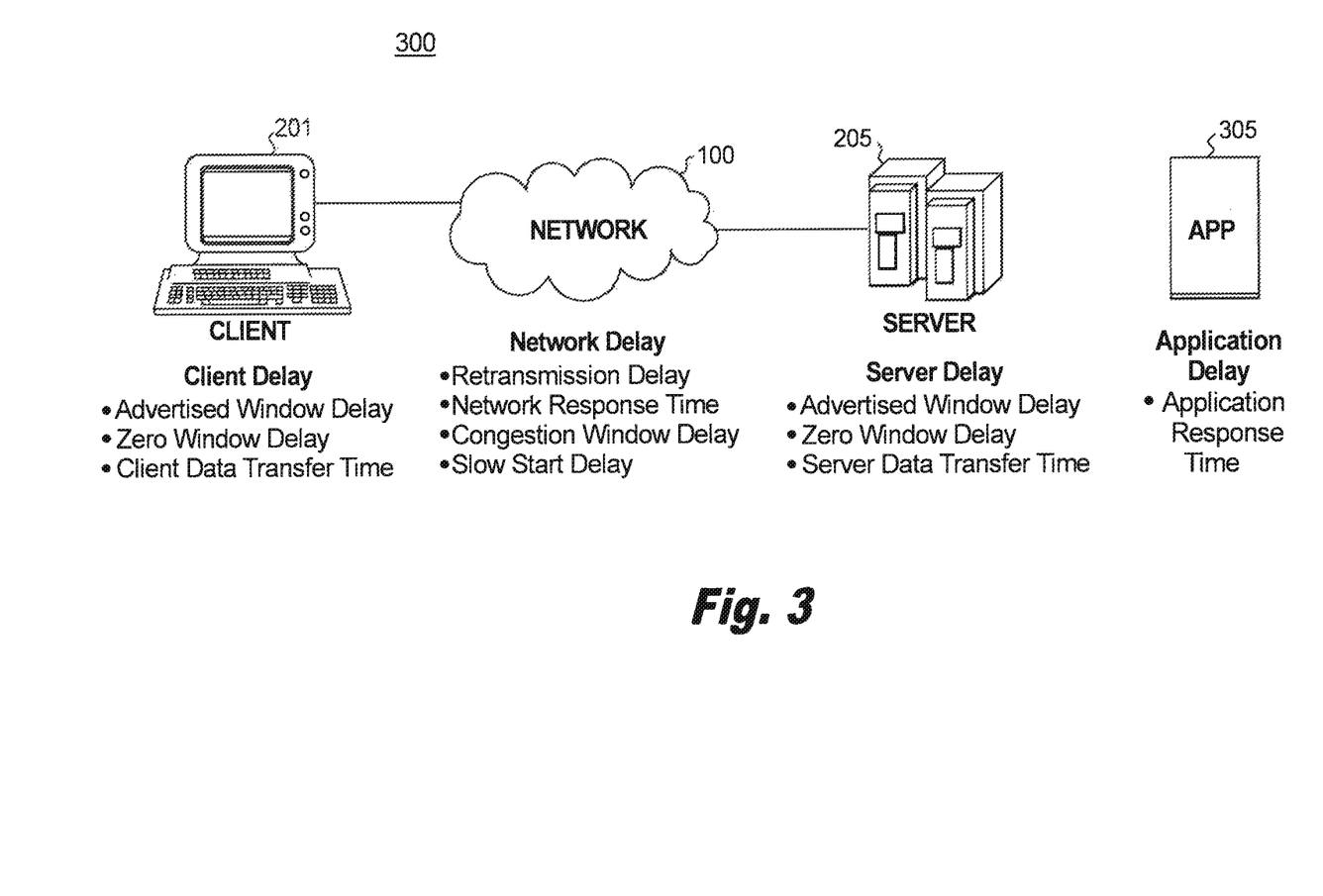
FIG. 3 illustrates a schematic diagram 300 showing various types of delay associated with respective network components.

For example, FIG. 3 illustrates a schematic diagram 300, showing various types of delay associated with respective network components. As shown, client node 201 includes client delays, such as advertised window delays, zero window delays, and client data transfer time. Network 100 delays include, for example, retransmission time, network response time, congestion window delay and slow start delays. Server 205 includes server delays such as advertised window delay, zero window delay, and server data transfer time. Application 305 includes application delays, such as application response time.

Figure 4:
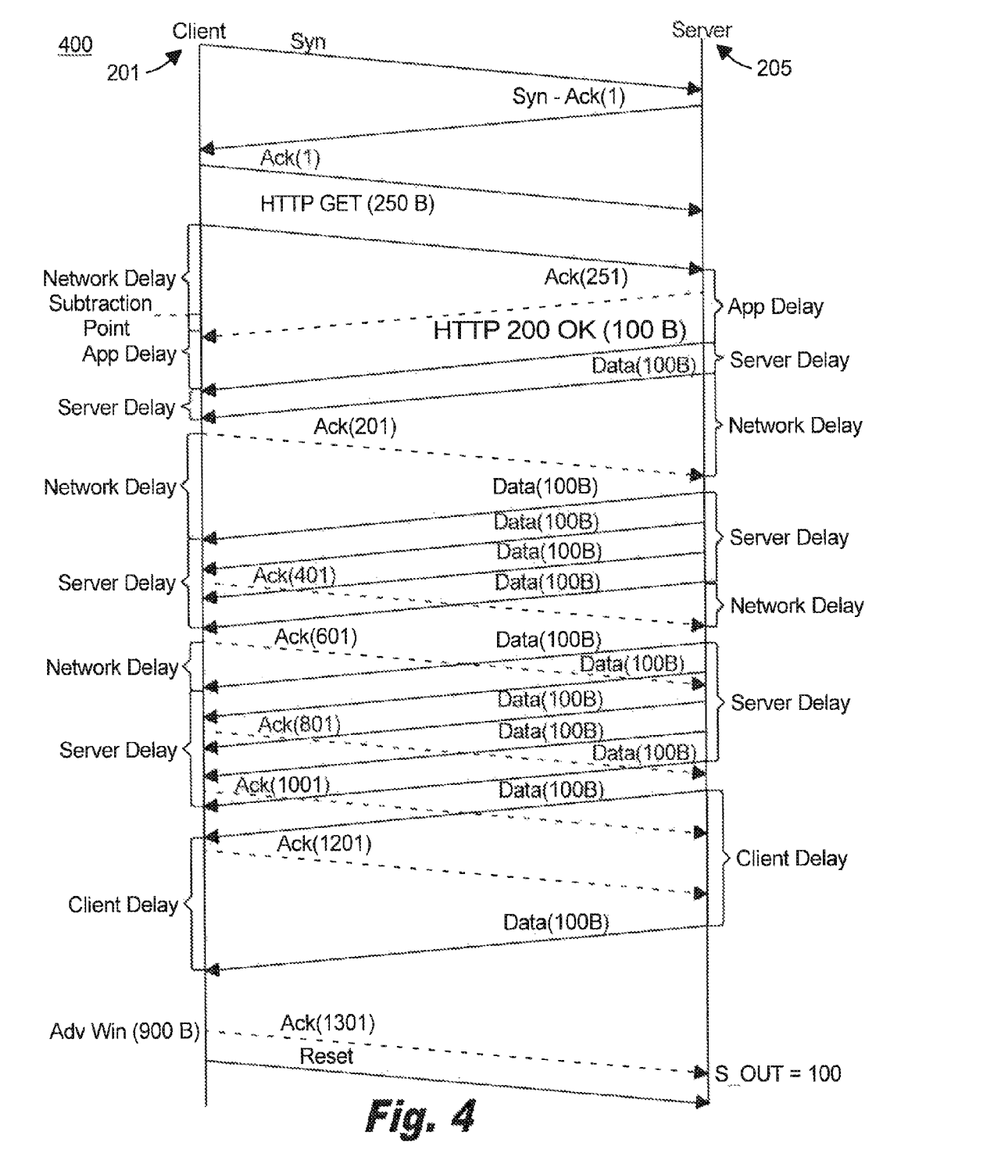
FIG. 4 is a signaling diagram, showing various types of client and server delays.

FIG. 4 is a signaling diagram 400 showing each of the above-described delays attributable to client 201 or server 205. Notably, determining each of these delays yields a location independent end-user response time since the same total response time and associated breakdown times are equivalent for each sides (including a middle point) of the signaling diagram.

For purposes of the discussion below, it should be noted that terms such as sender/receiver and endpoint are used and may refer to a client device or a server device, or both, as will be understood by those skilled in the art. Further, unless otherwise specified, each of these delays can be attributable to any client device, server device, or both.

Retransmission Delay

Figure 5:
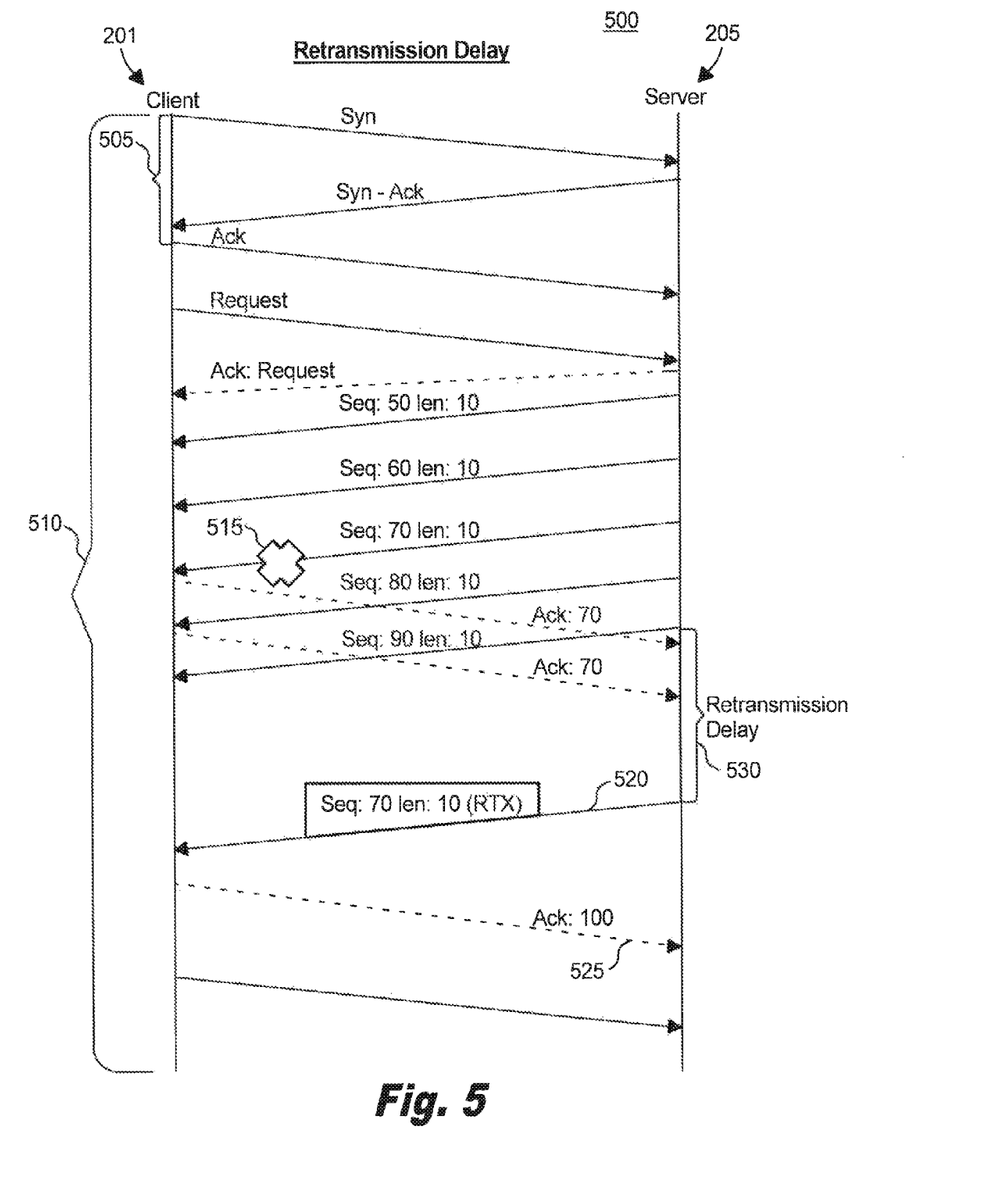
FIG. 5 is a signaling diagram, showing techniques for determining retransmission delay.

FIG. 5 is a signaling diagram 500, showing techniques for determining the retransmission delay. Transmission Control Protocol (TCP) is a stream based protocol and, accordingly, 'lost' data (i.e., lost segments) are retransmitted. A measurable delay associated with this retransmission impacts total network delay. According to the techniques discussed below, network monitoring device 204 determines the time for retransmission (i.e., a difference in time between ideal data transfer (without retransmission) and transfer of data actually completed with retransmission.

At signaling 505, an initial TCP flow is established whereby client 201 and server 205 exchange data such as window sizes, maximum segment size, and the like. Additionally, during signaling 505, initial sequence numbers for each endpoint are exchanged. The sequence numbers are used to order bytes transmitted between endpoints.

Collectively, data signaling 510 highlights data flows between endpoints—here, client 201 and server 205. During the data signaling 510, TCP acknowledgements ensure that data is received in proper order and without loss. In a typical TCP data flow, acknowledgments are sent from a receiver to a sender and are cumulative. That is, each acknowledgment acknowledges each byte or bytes correctly received up to the value of the acknowledgment. So, for example, if the acknowledgment has a value of 100, then the sender of data (which receives the acknowledgement) is notified the endpoint sending the acknowledgement received each sequenced byte up to and including sequence number 100. Network monitoring device 204 monitors or observes the TCP data flow including sequence numbers and acknowledgments transmitted between endpoints.

At data signal 515, a data segment (i.e., one or more TCP segments) is lost for various known reasons (e.g., timeout, etc.). In turn, client 201, using TCP techniques, attempts to recover such lost data and requests data retransmission from server 205 (e.g., using duplicate acknowledgements—"Ack: 70"). Server 205 receives the duplicate Ack: 70 and responds by sending "Seq. 70 len: 10" as a retransmission ("RTX").

Notably, network monitoring device 204 monitors the TCP data flow to determine when a particular data segment is retransmitted (e.g., via duplicate acknowledgment messages indicating a request for retransmission, via the retransmission itself, etc.). Put differently, network monitoring device 204 determines the occurrence of a retransmission when a particular TCP segment is transmitted twice, more than one acknowledgment is sent with the same value (e.g., evidence that the receiver of data is requesting retransmission), and the like.

Server 205 retransmits the lost data segment and resends Seq: 70 len: 10 at 520. Additionally, server 205 subsequently receives an acknowledgement at 525—"Ack: 100". As is understood by those skilled in the art, acknowledgement 525 indicates valid receipt of data sequences up to and including 100 (i.e., retransmitted Seq. 70, Seq. 80, and Seq. 90).

Network monitoring device 204 determines retransmission delay 530 as a difference in time between the retransmitted segment and the last (or previous) acknowledged transmitted segment—here this is sequence 90. That is, network monitoring device 204 monitors and processes data segments to identify retransmissions. Once a retransmission occurs, the time for retransmission delay (e.g., "wasted" time) is determined as follows: a timestamp of the latest retransmitted segment less the timestamp of the latest acknowledged segment (which is acknowledged by a current acknowledgment). Although the latest acknowledged segment—Seq: 90 len: 10 is not known until acknowledgement 525, network monitoring device 204 can identify and re-tabulate data transfers to identify the start time of the retransmission delay (i.e., at transmission of "acknowledged" Seq: 90 len: 10). In this way, the network monitoring device 204 accurately determines whether or not time was "wasted" or lost due to the loss of additional segments. If other segments were also lost (e.g. if Seq 90 was lost), then a future retransmission of Seq 90 would trigger another retransmission delay that would be determined by network monitoring device 204.

Application Response Time

Figure 6:
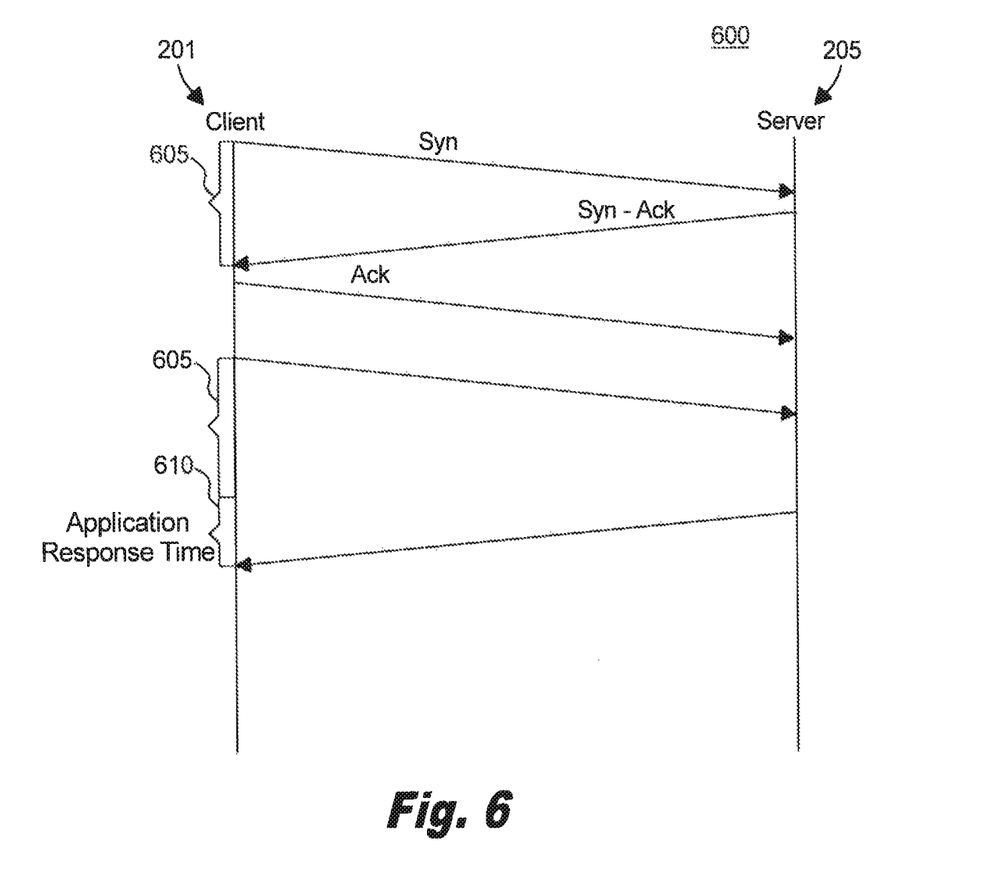
FIG. 6 is a signaling diagram, showing techniques for determining an application response time.

FIG. 6 is a signaling diagram 600, showing techniques for determining the Application Response Time (ART). ART particularly measures how long an application takes to respond to a client request. ART provides a useful network delay metric that typically contributes to slow end-user response time.

According to the techniques discussed below, ART is determined by network monitoring device 204 as a difference in time between a last segment sent by client 201 and a first data segment transmitted by server 205. Notably, if the measurement point is not next to or coincident with server 205 the time difference also includes some amount of network round trip (NRT) time, which network monitoring device 204 also accounts for.

With respect to the NRT, NRT is determined, for example, at signaling 605 or during an initial phase of the TCP connection—i.e., a three way exchange (Syn; Syn-Ack; Ack). In particular, network monitoring device determines the time between the Syn sent from client 201 and receipt of Sync-Ack from server 205, which is an accurate representation of the NRT time between client 201 and server 205 (e.g., two endpoints). Notably, network monitoring device 204, in certain embodiments, determines the NRT at a later point in data flow between client 201 and server 205, as is appreciated by those skilled in the art.

As discussed above, ART occurs during the time between a request from a client is received by the server and a response from the server occurs. However, to accurately determine ART, NRT must be subtracted. Accordingly, network monitoring device 204, using the previously determined NRT, subtracts NRT from the time between the request transmitted from client 201 to the response received from server 205.

Notably, signal diagram 600 is shown as if the measurement point was close to client 201, however, it should be appreciated by those skilled in the art that the measurement point is location independent.

Figure 7A:
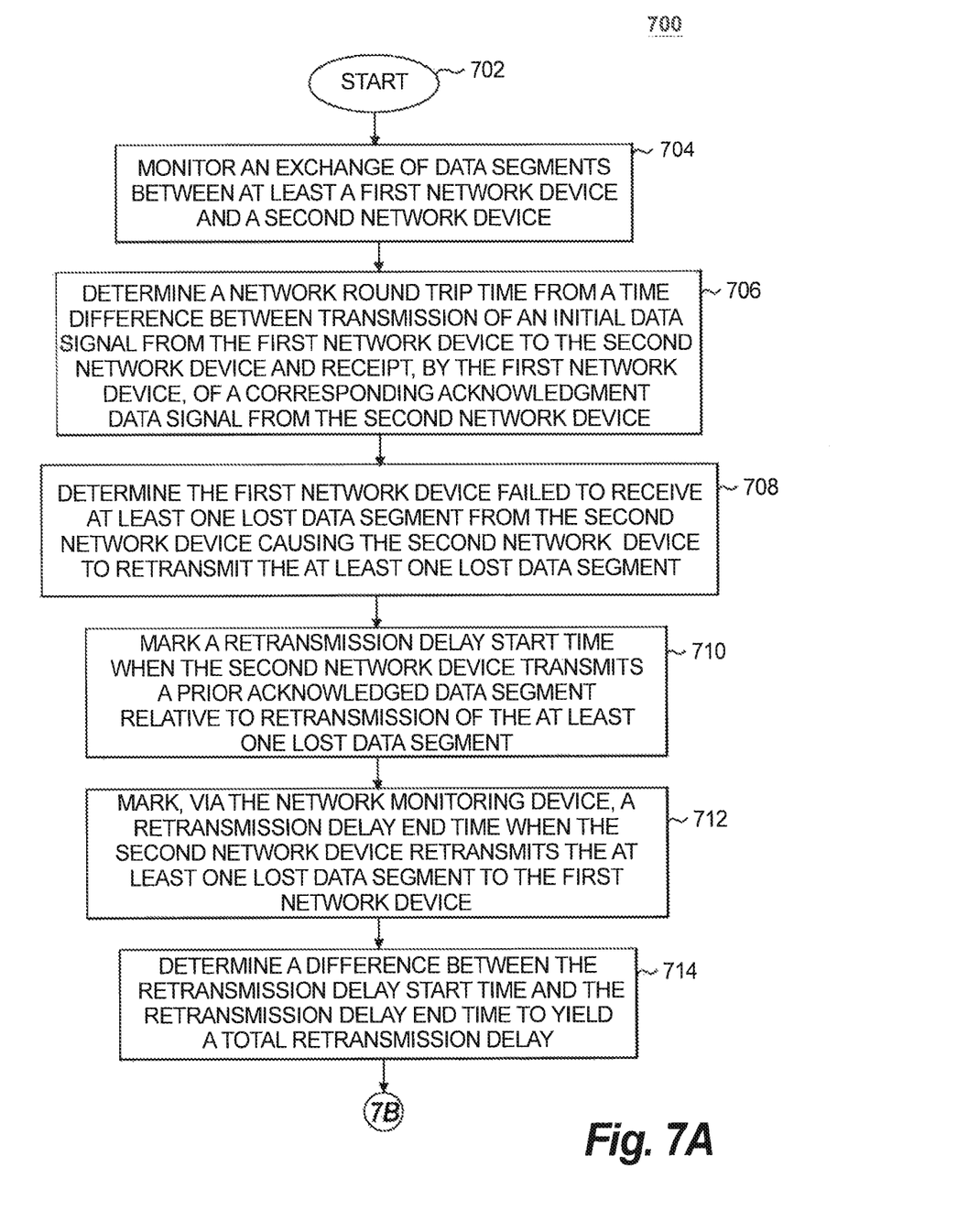
FIGS. 7A-7B illustrate an example simplified procedure for determining network delay, including the retransmission delay and application response time, independent of network location.
Figure 7B:
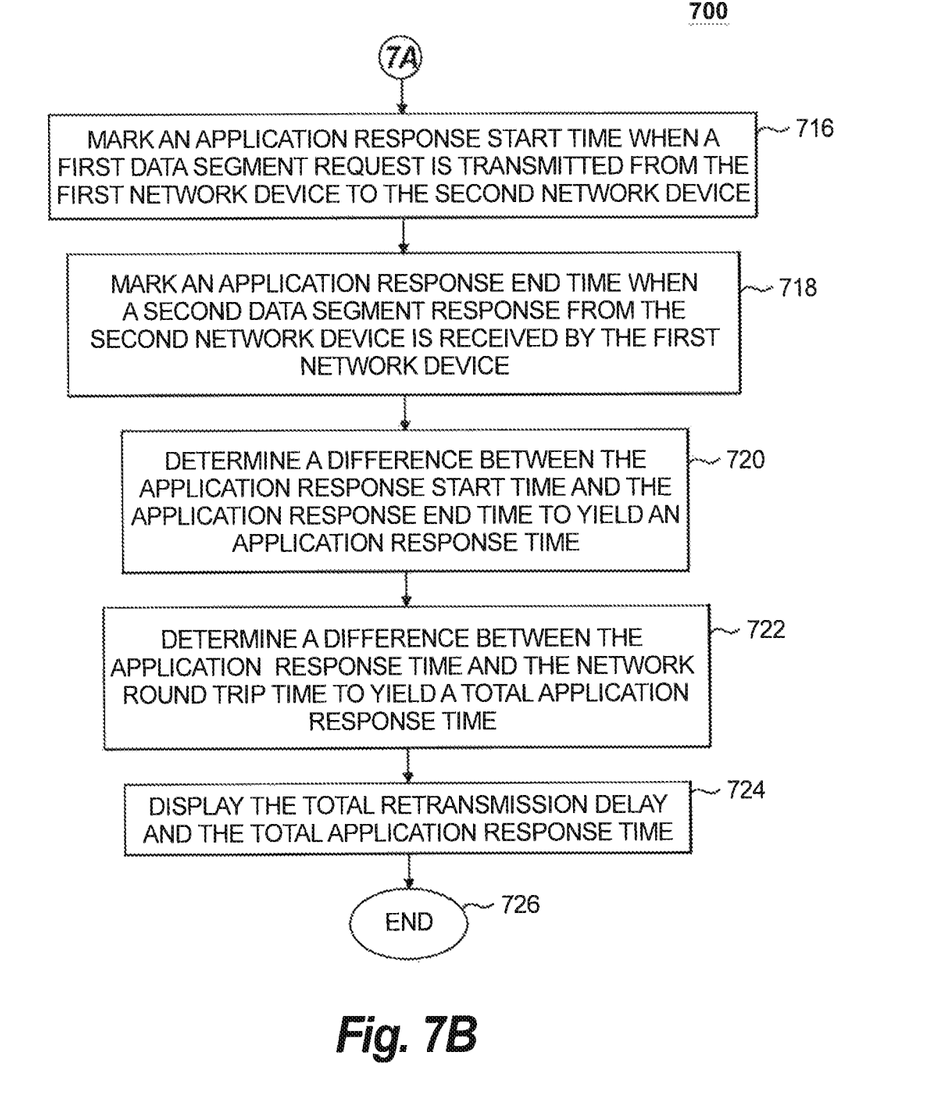

FIGS. 7A-7B illustrates an exemplary simplified procedure 700 for determining network delay (i.e., retransmission delay and application response time), in accordance with one or more embodiments described herein.

FIG. 7A begins at step 702 and continues to step 704 where, as discussed above, a network monitoring device monitors an exchange of data segments between at least a first network device and a second network device. Next, at step 706, the network monitoring device determines a network round trip time (NRT) from a time difference between transmission of an initial data signal from the first network device (e.g., a Syn signal in a TCP initial handshake) to the second network device and receipt, by the first network device, of a corresponding acknowledgement data signal from the second network device (e.g., a Syn-Ack in a TCP initial handshake). This NRT is used, as discussed above, to determine a total application response time.

With respect to retransmission delay, procedure 700 continues to step 708, where network monitoring device 204 determines that the first network device failed to receive at least one lost data segment from the second network device causing the second network device to retransmit the at least one lost data segment. Next, at step 710, the network monitoring device marks a retransmission delay start time when the second network device transmits a prior acknowledged data segment relative to retransmission of the at least one lost data segment. That is, referring back to FIG. 5, the retransmission start time begins when the second network device— shown as server 205—transmits the prior acknowledged data segment—Seq: 90 len: 10. Note, the Seq: 90 len 10 is acknowledged later at 525. However, network monitoring device 204 monitors each of the data signaling, including the subsequent acknowledgement and can re-tabulate timing to determine the actual retransmission delay.

In response to the lost data segment, the second network device retransmits the at least one lost segment and, at step 712, the network monitoring device marks an end time for the retransmission delay (ref. FIG. 5, signal 520—Seq: 70 len: 10 is the retransmitted signal). At step 714, the network monitoring device determines a difference between the retransmission delay start time and the retransmission delay end time to yield a total retransmission delay, which can be subsequently displayed (ref. step 724).

Procedure 700 also provides for determining the application response time (ART), as discussed above. At step 716, the network monitoring device marks an application response start time when a first data segment request is transmitted from the first network device to the second network device and at step 718, marks an application response end time when a second data segment response from the second network device is received by the first network device. The network monitoring device determines, at step 720, a difference between the application response start time and the application response end time to yield an application response time, subtracts out the previously determined NRT (ref. step 706) to yield a total application response time at step 722. The network monitoring device displays the total retransmission delay and the total application response time at step 724 (e.g., via a resident display).

Procedure 700 subsequently ends at 726, or it can optionally begin again at step 702. In certain other embodiments, procedure 700 may continue to any other of the steps above to determine any desired type of network delay. It should be noted that certain steps within procedure 700 may be optional and further, the steps shown in FIGS. 7A-7B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for determining network delay with location independence. In particular, the techniques herein provide scalable solutions for future cloud or virtualized environments to measure important network metrics (e.g., delay), which assists troubleshooting and facilitates developing mitigation techniques. Moreover, the above-discussed network retransmission delay and application response times can be made on a client-side/server-side or somewhere there-between. That is, using the techniques discussed above, network monitoring device 204 can monitor data signaling and determine the various network delays anywhere in the network (e.g., near the server 205, and/or somewhere there-between, etc.) without affecting the network delay or application response time determination.

While there have been shown and described illustrative embodiments that provide for location independent techniques for determining network delay, it is to be understood that various other adaptations and modifications may be made within the spirit and scope of the embodiments herein. For example, the embodiments have been shown and described herein with relation to a particular client/server; however, the embodiments in their broader sense are not as limited, and may, in fact, be used with various types of client-devices/server-devices, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for monitoring retransmission delay in a communication network comprising:
    monitoring, via a network monitoring device, an exchange of data segments between at least a first network device and a second network device;
    determining, via the network monitoring device, the first network device failed to receive at least one lost data segment from the second network device causing the second network device to retransmit the at least one lost data segment;
    marking, via the network monitoring device, a retransmission delay start time when the second network device transmits a latest acknowledged data segment relative to retransmission of the at least one lost data segment;
    marking, via the network monitoring device, a retransmission delay end time when the second network device retransmits the at least one lost data segment to the first network device; and
    determining a difference between the retransmission delay start time and the retransmission delay end time to yield a total retransmission delay.

2. The method of claim 1, further comprising:
    displaying, via a display of the network monitoring device, the total retransmission delay.

3. The method of claim 1, wherein determining, via the network monitoring device, the first network device failed to receive at least one lost data segment from the second network device comprises:
    determining the second network device retransmits the at least one lost data segment.

4. The method of claim 1, wherein determining, via the network monitoring device, the first network device failed to receive at least one lost data segment from the second network device comprises:
    determining the second network device receives an acknowledgement from the first network device having the same value as a prior acknowledgement.

5. The method of claim 1, wherein the first network device and the second network device include at least one of a client and a server.

6. The method of claim 1, wherein the first network device and the second network device exchange data segments via a Transmission Control Protocol (TCP).

7. A network monitoring device, comprising:
    one or more network interfaces adapted to communicate in a communication network;
    a processor adapted to execute one or more processes; and
    a memory configured to store a process executable by the processor, the process when executed operable to:
        monitor an exchange of data segments between at least a first network device and a second network device;

determine the first network device failed to receive at least one lost data segment from the second network device causing the second network device to retransmit the at least one lost data segment;

mark a retransmission delay start time when the second network device transmits a latest acknowledged data segment relative to retransmission of the at least one lost data segment;

mark, via the network monitoring device, a retransmission delay end time when the second network device retransmits the at least one lost data segment to the first network device; and determine a difference between the retransmission delay start time and the retransmission delay end time to yield a total retransmission delay.

8. The network monitoring device of claim 7, further comprising:
a display that displays the total retransmission delay.

9. The network monitoring device of claim 7, wherein the first network device and the second network device include at least one of a server device and a client device.

10. The network monitoring device of claim 7, wherein, the process, when executed to determine the first network device failed to receive at least one lost data segment from the second network device, is further operable to:
determine the second network device retransmits the at least one lost data segment.

11. The network monitoring device of claim 7, wherein, the process, when executed to determine the first network device failed to receive at least one lost data segment from the second network device, is further operable to:
determine the second network device receives an acknowledgement from the first network device having the same value as a prior acknowledgement.

12. A method for monitoring application response time in a communication network comprising:
monitoring, via a network monitoring device, an exchange of data between at least a first network device and a second network device;

determining, via the network monitoring device, a network round trip time from a time difference between transmission of an initial data signal from the first network device to the second network device and receipt, by the first network device, of a corresponding acknowledgement data signal from the second network device;

marking, via the network monitoring device, an application response start time when a first data segment is transmitted from the first network device to the second network device;

marking, via the network monitoring device, an application response end time when a second data segment from the second network device is received by the first network device;

determining, via the network monitoring device, a difference between the application response start time and the application response end time to yield an application response time; and determining, via the network monitoring device, a difference between the application response time and the network round trip time to yield a total application response time.

13. The method of claim 12, further comprising:
displaying, via a display of the network monitoring device, the total application response time.

14. The method of claim 12, wherein the first network device and the second network device include at least one of a client and a server.

15. The method of claim 12, wherein the first data segment is a requesting data segment and the second data segment is a responding data segment.

16. A network monitoring device, comprising:
one or more network interfaces adapted to communicate in a communication network;
a processor adapted to execute one or more processes; and
a memory configured to store a process executable by the processor, the process when executed operable to:
monitor an exchange of data between at least a first network device and a second network device;

determine a network round trip time from a time difference between transmission of an initial data signal from the first network device to the second network device and receipt, by the first network device, of a corresponding acknowledgement data signal from the second network device;

mark an application response start time when a requesting data segment is transmitted from the first network device to the second network device;

mark an application response end time when a responding data segment from the second network device is received by the first network device;

determine a difference between the application response start time and the application response end time to yield an application response time; and determine a difference between the application response time and the network round trip time to yield a total application response time.

17. The network monitoring device of claim 16 further comprising:
a display that displays the total application response time.

18. The network monitoring device of claim 16, wherein the first network device and the second network device include at least one of a server device and a client device.

19. A tangible, non-transitory, computer-readable media having software encoded thereon, the software, when executed by a processor, operable to:
monitor an exchange of data segments between at least a first network device and a second network device;

determine a network round trip time from a time difference between transmission of an initial data signal from the first network device to the second network device and receipt, by the first network device, of a corresponding acknowledgement data signal from the second network device;

determine the first network device failed to receive at least one lost data segment from the second network device causing the second network device to retransmit the at least one lost data segment;

mark a retransmission delay start time when the second network device transmits a latest acknowledged data segment relative to retransmission of the at least one lost data segment;

mark, via the network monitoring device, a retransmission delay end time when the second network device retransmits the at least one lost data segment to the first network device;

determine a difference between the retransmission delay start time and the retransmission delay end time to yield a total retransmission delay;

mark an application response start time when a first data segment request is transmitted from the first network device to the second network device;

mark an application response end time when a second data segment response from the second network device is received by the first network device;

determine a difference between the application response start time and the application response end time to yield an application response time;

determine a difference between the application response time and the network round trip time to yield a total application response time; and display the total retransmission delay and the total application response time.

\* \* \* \* \*